US011870058B2

(12) United States Patent
Beard

(10) Patent No.: US 11,870,058 B2
(45) Date of Patent: *Jan. 9, 2024

(54) METHOD OF FORMING A COMPOSITION AND THE COMPOSITION FORMED THEREFROM

(71) Applicant: TEEBS R&D, LLC, Malvern, PA (US)

(72) Inventor: Trevor Beard, Norristown, PA (US)

(73) Assignee: TEEBS R&D, LLC, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,128

(22) Filed: May 7, 2019

(65) Prior Publication Data

US 2019/0338083 A1 Nov. 7, 2019

Related U.S. Application Data

(60) Provisional application No. 62/667,799, filed on May 7, 2018.

(51) Int. Cl.
| | | |
|---|---|---|
| *H01M 4/22* | (2006.01) | |
| *C01B 32/312* | (2017.01) | |
| *H01M 4/04* | (2006.01) | |
| *H01M 4/583* | (2010.01) | |
| *H01M 4/62* | (2006.01) | |
| *H01M 10/12* | (2006.01) | |
| *C08K 3/013* | (2018.01) | |
| *C08J 3/09* | (2006.01) | |
| *C08J 3/14* | (2006.01) | |
| *C08J 3/215* | (2006.01) | |
| *C08J 5/18* | (2006.01) | |
| *C08J 9/28* | (2006.01) | |
| *C08K 3/04* | (2006.01) | |
| *H01M 50/406* | (2021.01) | |
| *H01M 4/02* | (2006.01) | |

(52) U.S. Cl.
CPC ............ *H01M 4/22* (2013.01); *C01B 32/312* (2017.08); *C08J 3/095* (2013.01); *C08J 3/096* (2013.01); *C08J 3/097* (2013.01); *C08J 3/14* (2013.01); *C08J 3/215* (2013.01); *C08J 5/18* (2013.01); *C08J 9/28* (2013.01); *C08K 3/013* (2018.01); *C08K 3/04* (2013.01); *H01M 4/0497* (2013.01); *H01M 4/583* (2013.01); *H01M 4/625* (2013.01); *H01M 10/12* (2013.01); *H01M 50/406* (2021.01); *C01P 2004/03* (2013.01); *C08J 2205/044* (2013.01); *C08J 2327/16* (2013.01); *C08J 2329/04* (2013.01); *C08J 2379/08* (2013.01); *C08J 2427/20* (2013.01); *C08K 2201/005* (2013.01); *H01M 4/622* (2013.01); *H01M 2004/021* (2013.01); *H01M 2004/027* (2013.01)

(58) Field of Classification Search
CPC ............ C08J 3/122; C08J 3/14; H01M 4/0497
See application file for complete search history.

(56) References Cited

U.S. PATENT DOCUMENTS

| | | | |
|---|---|---|---|
| 3,930,881 A | 1/1976 | Cestaro et al. | |
| 4,182,850 A | 1/1980 | Marshall et al. | |
| 4,320,185 A * | 3/1982 | Bernstein | ............. H01M 4/0411 |
| | | | 429/217 |
| 4,400,501 A | 8/1983 | Lane, Jr. et al. | |
| 4,622,384 A | 11/1986 | Manwiller | |
| 4,685,415 A | 8/1987 | Wegner | |
| 5,229,448 A | 7/1993 | Cooper | |
| 5,260,855 A | 11/1993 | Kaschmitter et al. | |
| 5,286,568 A * | 2/1994 | Bacino | ................. C09D 127/12 |
| | | | 428/318.6 |
| 5,384,352 A | 1/1995 | Andres et al. | |
| 5,416,156 A * | 5/1995 | Kamen | .................... A61K 8/02 |
| | | | 523/206 |
| 6,466,429 B1 | 10/2002 | Volkovich et al. | |
| 6,669,860 B1 | 12/2003 | Satoshi et al. | |
| 7,110,242 B2 | 9/2006 | Adrianov et al. | |
| 7,119,047 B1 | 10/2006 | Adrianov et al. | |

(Continued)

FOREIGN PATENT DOCUMENTS

| | | |
|---|---|---|
| CN | 1180250 | 4/1998 |
| CN | 101877395 A | 11/2010 |

(Continued)

OTHER PUBLICATIONS

Common Solvents flyer (Year: 2020).*
Dimethylacetamide flyer (Year: 2017).*
Silica flyer (Year: NA) (Year: NA).*
Carbon Black flyer (Year: NA) (Year: NA).*
Polyvinylidene Fluoride flyer (Year: NA).*
International Search Report; International Application No. PCT/US2019/031065; International Filing Date: May 7, 2019; dated Jul. 15, 2019; 6 Pages.
Pasquier et al. "Plastic PVDF-HFP electrolyte laminates prepared by a phase-inversion process," Solid State Ionics, 2000, pp. 249-257, vol. 135.
Written Opinion; International Application No. PCT/US2019/031065; International Filing Date: May 7, 2019; dated Jul. 15, 2019; 9 Pages.

(Continued)

*Primary Examiner* — Irina Krylova
(74) *Attorney, Agent, or Firm* — Bay State IP, LLC

(57) ABSTRACT

In an aspect, a method of making a composition, comprising forming a solvent mixture comprising a polymer and a solvent; precipitating the solvent mixture with a non-solvent to form the composition comprising the filler in a fibrillated polymer matrix, wherein the composition is in the form of a particulate and at least one of the solvent and the non-solvent comprises a filler; and separating the composition from the solvent and the non-solvent to isolate the composition. In another aspect, a porous material wherein the filler particles are mechanically bonded together by the polymer and wherein the polymer is present as filaments adhering to and connecting the filler particles across interstitial spaces between the filler particles. In another aspect, a precipitated polymer solution produced by a phase inversion where the majority of the liquids can be mechanically removed.

10 Claims, 6 Drawing Sheets

(56) References Cited

U.S. PATENT DOCUMENTS

| | | |
|---|---|---|
| 7,491,769 B2 | 2/2009 | Patel et al. |
| 7,881,042 B2 | 2/2011 | Buiel et al. |
| 8,023,251 B2 | 9/2011 | Buiel et al. |
| 8,147,732 B2 | 4/2012 | Beard |
| 8,404,384 B2 | 3/2013 | Feaver et al. |
| 8,470,898 B2 | 6/2013 | Huang |
| 9,112,230 B2 | 8/2015 | Feaver et al. |
| 9,202,638 B2 | 12/2015 | Ramin et al. |
| 9,251,969 B2 | 2/2016 | Dandrea |
| 9,339,769 B2 | 5/2016 | Beard et al. |
| 9,409,777 B2 | 8/2016 | Geramita et al. |
| 9,478,364 B2 | 10/2016 | Gadkaree et al. |
| 9,580,321 B2 | 2/2017 | Feaver et al. |
| 2011/0105635 A1* | 5/2011 | Van Beijma ............ A61L 27/18 521/155 |
| 2012/0258336 A1 | 10/2012 | Jun et al. |
| 2013/0171359 A1 | 7/2013 | Wei et al. |
| 2013/0183568 A1 | 7/2013 | Babinec et al. |
| 2013/0320758 A1 | 12/2013 | Fujiwara |
| 2014/0120385 A1 | 5/2014 | Yaegashi et al. |
| 2015/0037651 A1 | 2/2015 | Huang |
| 2015/0270552 A1 | 9/2015 | Lee et al. |
| 2019/0341604 A1* | 11/2019 | Turi ............................ C08J 3/14 |

FOREIGN PATENT DOCUMENTS

| | | | |
|---|---|---|---|
| CN | 105295264 A | | 2/2016 |
| CN | 105900199 A | | 8/2016 |
| EP | 2704991 A | | 3/2014 |
| EP | 3455895 A | | 3/2019 |
| GB | 868651 | * | 5/1961 |
| JP | 11329904 | | 11/1999 |
| JP | 201519973 | | 5/2014 |
| JP | 2015219974 A | | 5/2014 |
| JP | S070126 B2 | | 2/2017 |
| KR | 20110135306 A | | 12/2011 |
| WO | 2016210419 | | 12/2016 |
| WO | 2017197299 A1 | | 11/2017 |

OTHER PUBLICATIONS

Yang et al.; "Single-Step Fabrication Using a Phase Inversion Method of Poly(vinylidene fluoride) (PVDF) Activated Carbon Air Cathodes for Microbial Fuel Cells"; Environmental Science and Technology Letters, vol. 1, No. 10; Oct. 2014; pp. 413-420.

Zhang et al.; "Study on adsorption and desorption of ammonia on graphene"; Nanoscale Research Letters, vol. 10, No. 359; Sep. 2015; pp. 1-8.

* cited by examiner

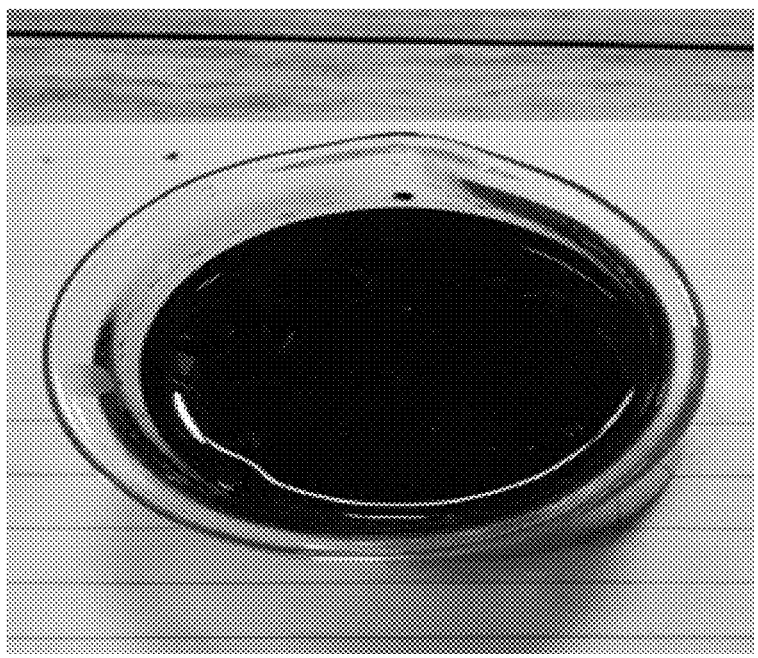
FIG. 6A1
FIG. 6B1

FIG. 6A2
FIG. 6B2

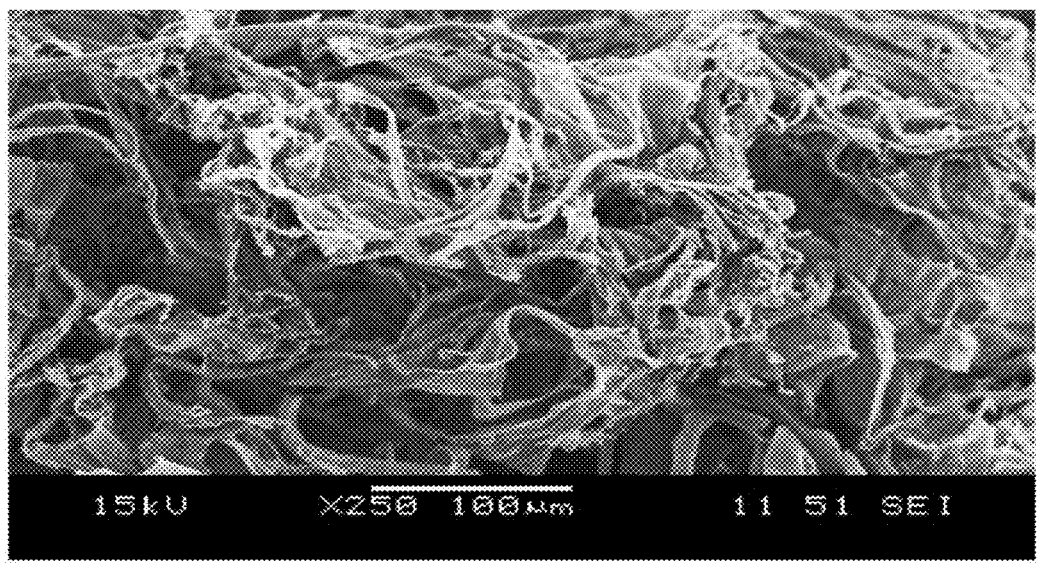
Fig. 7A
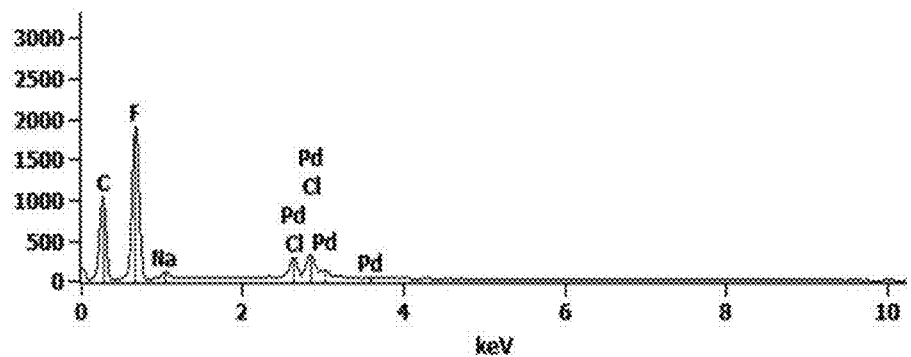
Fig. 7B
| Element Line | Weight % | Weight % Error |
|---|---|---|
| C K | 53.27 | ± 1.35 |
| F K | 37.57 | ± 0.32 |
| Na K | 0.92 | ± 0.05 |
| Cl K | 2.07 | ± 0.07 |
| Cl L | --- | --- |
| Pd L | 6.16 | ± 0.40 |
| Pd M | --- | --- |
| Total | 100.00 | |
Fig. 7C

METHOD OF FORMING A COMPOSITION AND THE COMPOSITION FORMED THEREFROM

CROSS-REFERENCE TO RELATED APPLICATION

This application claims the benefit of U.S. Provisional Patent Application Ser. No. 62/667,799 filed May 7, 2018. The related application is incorporated herein in its entirety by reference.

BACKGROUND

Applications for filled polymer materials, such as battery electrodes, process equipment components, chemical detectors, sensors, filtration systems, and the like, can benefit from direct, intimate, and full surface contact between the media being treated, reacted, tested, or processed and the fillers used to achieve said processes or conversion operations. At the same time, the filled composite materials used in many of these disparate industries and operations must securely attach solid particles or powders to a binder, often a polymer material, while still allowing high surface exposure of the filler so as to achieve a high degree of interaction between the filler particles and an external fluid or media. Achieving this balance of binding the filler particles together while maintaining a high surface exposure with sufficient stand-alone structural integrity is difficult though.

Typical filled composite materials have been made by various processes including solution or slurry casting, sintering, extruding, calendering, compression molding, and the like. However, these methods are largely indiscriminate in the placement of the fillers with the binder as the filler materials tend to aggregate before or during formation, resulting in encumbered access to the filler surfaces. Furthermore, these processes often produce filler materials with a thin surface layer of binder that effectively encapsulates the filler, thereby limiting access to the encapsulated filler material. The net result is that filled composite materials made using these processes can suffer from limited access to the surfaces of the filler materials, leading to a reduced performance in many applications.

Battery electrodes, for example, contain filler particles (often referred to as the active material) that contact an electrolyte medium to conduct ions. Using conventional processes to form active layers for electrodes can result in a reduced surface exposure of the active material that can limit the flow of ions into and out of the respective particles due to the reduced access of the electrolyte to the active material. Additionally, the reduced surface exposure of the active material due to the presence of the binder on its surface can result in an increase in the electrical resistance of the composite, greatly reducing electron flow through or around the deposited binder, rendering a poor battery electrode. The net effect is that a battery possessing electrodes with such a reduced level of exposed surface area of active materials can have a lower rate capability (reduced power), which in turn can also effectively result in lower specific capacity (lower energy density).

Post-processing operations that have been used to compress active layers in electrodes to provide a tighter packing and contact among the conductive filler particles can further compound these issues associated with poor surface exposure of the active material. For example, compression of filled composite active layers made using conventional processes, where the filler surfaces are not well exposed within or on the polymer film in the first place, can cause an additional and significant decrease in accessible surface area to the filler surfaces due to a reduction in the interstitial volume or porosity between filler particles. The decrease in accessible surface area arises as the reduction in the interstitial volume or porosity can reduce the access of the electrolyte medium to the filler materials in the composite of the electrode. Ultimately, the compression of the active layer can exacerbate the already limited access of the electrolyte medium to the active material due to collapse of the pores of the composite and the reduction in the number of pathways for ion flow, each of which can hinder battery performance.

Additional drawbacks to using conventional processes to manufacture filled composite materials can include issues with solvent casting and issues with the drying processes. These issues can include a low coating thickness, a slow drying rate of solvent or diluent carrier media, and the need to reclaim or incinerate the solvents, each of which can encumber burdensome manufacturing costs. In addition, these processes can present risks for degrading the functionality of the filled composite material in the final product as a binder rich, filler deprived layer within the filled composite material near a carrier substrate can form.

A process for forming a composition is therefore desired that can achieve one or more of a high filler content, a uniform filler distribution, a uniform porosity, or a low surface coverage of the binder on the filler to enable greater access to filler material surface area. It would also be desirable if the process could allow for easy, rapid, direct, or low-cost creation of uniform, optionally highly filled compositions with controllable formatting of final membrane macrostructures that contain desired degrees of void content/porosity that is otherwise not evident.

BRIEF SUMMARY

Disclosed herein is a method of forming a composition and the composition formed therefrom.

In an aspect, A method of making a composition, the method comprises forming a solvent mixture comprising a polymer and a solvent; precipitating the solvent mixture with a non-solvent to form the composition comprising the filler in a fibrillated polymer matrix, wherein the composition is in the form of a particulate and at least one of the solvent and the non-solvent comprises a filler; and separating the composition from the solvent and the non-solvent to isolate the composition.

In another aspect, a porous material manufactured by a phase inversion process, wherein after removal of the solvent and the non-solvent, the filler particles are mechanically bonded together by the polymer and wherein the polymer is present as filaments adhering to and connecting the filler particles across interstitial spaces between the filler particles; and wherein the respective filler particles have bonded filament connections to one or more other particles.

In another aspect, a precipitated polymer solution produced by a phase inversion where the majority of the liquids, typically 90% or more, including solvents and non-solvents, are mechanically removed, such as by at least one of filtration, settling, decanting, centrifugation, spray-up, or filter cake compression.

The above described and other features are exemplified by the following figures, detailed description, and claims.

BRIEF DESCRIPTION OF THE DRAWINGS

The following figures are exemplary aspects, which are provided to illustrate the present disclosure. The figures are illustrative of the examples, which are not intended to limit devices made in accordance with the disclosure to the materials, conditions, or process parameters set forth herein.

FIG. 6A1 is a top view of the phase inversion method of Example 3;

FIG. 6A2 is a side view of the phase inversion method of Example 3;

FIG. 6B1 is a top view of a comparative phase inversion method of Example 3;

FIG. 6B2 is a side view of a comparative phase inversion method of Example 3;

FIG. 7A is a scanning electron microscopy image of the PVDF after removal of the salt of Example 4;

FIG. 7B is a graphical analysis of the levels of periodic elements in the composition from FIG. 7A; and FIG. 7C is a chart of the levels of the periodic elements in the composition from FIG. 7A.

DETAILED DESCRIPTION

Figure 1:
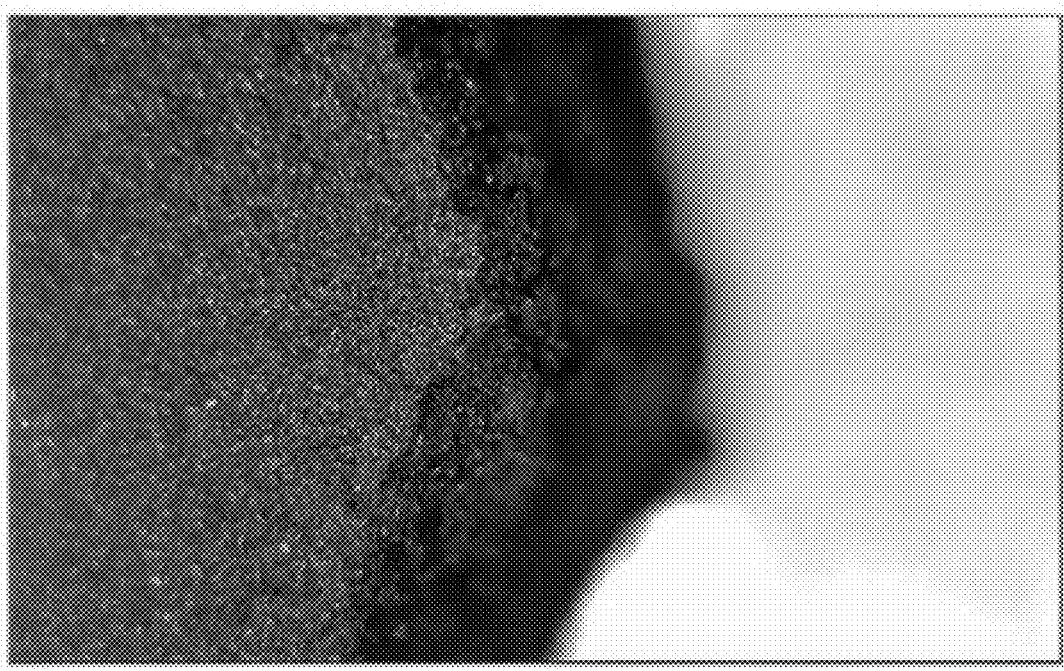
FIG. 1 is a photographic image of the carbon-PVDF layer of Example 1.

A method of making a composition was developed. The method comprises forming a solvent mixture comprising a polymer matrix and a solvent; combining the solvent mixture with a non-solvent to form a precipitate of the composition comprising a fibrillated polymer; and separating the precipitate from the solvent and the non-solvent. At least one of the solvent mixture or the non-solvent comprises a filler. A layer can be formed from the composition that is comprised of a multitude of structures. If desired, the composition can be densified by the application of physical force such as by calendering. The composition can comprise 0 to 95 weight percent (wt %) of the filler, or greater than or equal to 85 weight percent of the filler, or 75 to 99 weight percent; and 5 to 100 weight percent, or 1 to 15 weight percent, or 1 to 25 weight percent of the fibrillated polymer matrix; wherein the weights are based on the total weight of the composition. As used herein, amounts based on the composition are determined based on the solids and without any solvent or non-solvent being present. Without being bound by theory, it is believed that the present method results in a composition having a different morphology as compared to compositions prepared by different methods, including a higher proportion of exposed surface area of the filler or a multiscale porosity. It is further believed that presence the polymer matrix fibrils can act as a matrix stabilizer imposing various stresses on the filler particles at least during the formation of the composition to maintain the structural integrity of the composition, thereby allowing it to be a free-standing layer.

The present method can result in a composition with a filler content of greater than or equal to 90 volume percent (vol %) based on the total volume of the composition, where the filler particles are attached to the polymer or are embedded within the composition in a manner that provides a very high level of exposed surface area of the filler particles. The incorporation of a high amount of fillers can be beneficial in reducing the overall cost of an article by minimizing the polymer content or in providing additional functional properties to the product. These properties can be many fold and without being held to any specifics can include at least one of catalytic/enzymatic effects, filtration/binding properties for other molecules, direct chemical reactions, or biological purification.

This method can result in the incorporation of a large volume of filler, in the form of micron, submicron, or smaller sized particles or powders, abundantly disposed on the surfaces of an interconnected, porous, or solid polymer matrix. A high degree of exposure of the surfaces of the filler material can benefit the use of such materials in applications such as electrodes for battery applications as well as for other electrochemical applications, in which greater surface exposure of said filler enhances product performance.

The present method can comprise utilizing a dissolvable filler that can dissolve at least partially in at least one of the solvent, the non-solvent, or a third solvent different from the solvent and the non-solvent. The method can comprise dissolving the dissolvable filler during or after forming the composition to result in a composition that is free of the dissolvable filler.

In an aspect, the dissolvable filler is compatible with the polymer, such that it is present in (dissolved in) the composition after phase inversion. The dissolvable filler is then dissolved from the composition to provide additional porosity. The filler can be removed fully or partially from the composition to provide the desired degree of additional porosity.

Post-processing techniques that involve compressing or effectively densifying the aforementioned filled composition into a larger format can also benefit from the particle exposure with respect to maintaining a significant degree of the original interstitial volume between filler materials. Due to the lower content of polymer in the composition and the relatively high level of exposure of the filler material, if present, the fillers can act as pillars to maintain pore pathways throughout the filled, polymer matrix after compression.

The method for manufacturing this composition can include at least one of the ability to avoid the need for a substrate, a faster through-put fabrication of final composition, or a reduction in drying operations by greater than 90 wt % of the solvent and non-solvent used in the phase inversion method. In addition, unlike other processing techniques used to form highly filled compositions, the typical repulsive forces that exist between the particles can be overcome. Without being held to any specifics, it is believed that the high level of filler can be consolidated and brought into close proximity using a minimal amount of polymer.

Unlike other typical phase inversion processes, whereby a bulk polymer film is introduced into a non-solvent bath under low shear mixing conditions, the present method of mixing a solvent mixture with a non-solvent allows for a high degree of entanglement of polymer chains with each other to embed or attach with the filler particles. The present method can further result in a reduced contraction, shrinkage, or recoiling of the polymer chains as compared to other phase inversion process, for example, based on either quenching in a non-solvent bath, solvent evaporation, or by thermal phase inversion.

The present method can comprise forming a solvent mixture comprising the polymer, the solvent, and optionally a filler. The solvent mixture can be formed by mixing the polymer and the filler with the solvent to dissolve the polymer and form the solvent mixture. The solvent mixture can be formed by dissolving the polymer in a solvent and then adding the filler to form the solvent mixture. In the solvent mixture, the polymer can be fully dissolved in a solvent and the added fillers can be mixed to make a homogeneous solvent mixture. The solvent mixture can be formed by dissolving the polymer in a solvent and the non-solvent can comprise the filler.

As is easily determined by those in the art, the solvent mixture can comprise a sufficient amount of the solvent to dissolve the polymer. Forming the solvent mixture can comprise mixing for a sufficient amount of time to dissolve the polymer that can range from minutes to hours depending on the intensity of the mixing and the relative amounts of the solvent and the polymer. The solvent mixture can be mixed until a slurry is formed, where the filler is suspended in the solvent mixture.

The solvent mixture can comprise 0 to 98 wt %, or 85 to 98 wt %, or 90 to 96 wt % of the filler based on the total weight of the mixture minus any solvent. The solvent mixture can comprise 2 to 100 wt %, or 2 to 15 wt %, or 4 to 10 wt % of the polymer based on the total weight of the mixture minus any solvent.

After forming the solvent mixture, the solvent mixture is combined with a non-solvent to form a precipitate comprising the filler in a fibrillated polymer matrix. At least one of the solvent mixture or the non-solvent can comprise the filler. It is noted that after combining with the non-solvent, the precipitate is not in the form of a layer and could instead be considered as being particulate. The particles can be of any size, but are separate from each other. To the extent that the particles are in contact, the particles are not strongly bonded to each other, and can be readily separated, for example upon filtration, stirring, or the like. It is also noted, that the term non-solvent is merely used to indicate that the polymer matrix is less soluble in the non-solvent as compared to the solvent and that combining the solvent mixture and the non-solvent causes the precipitation of the particulates. The combining with the non-solvent results in a phase inversion of the polymer dissolved in the solvent to a precipitated polymer matrix present in the non-solvent, as the solvent diffuses out of the non-solvent.

Without intending to be bound by theory, it is believed that during the combining, the interfacial surface tension between the non-solvent and the filler material can result in repulsive forces between the fillers and non-solvent as a result of the difference in their relative surface energies. This difference is thought to create a high level of exposure of the filler surface in the composition. For example, a hydrophobic carbon material in an acetone-polymer solution can preferentially deposit onto the surface of a hydrophobic polymer during phase inversion using water as the non-solvent. The resulting composition accordingly contains filler particles having a high exposure to pores of the composition.

The combining can comprise injecting the solvent mixture via an injection nozzle into the non-solvent to induce a shear on the solvent mixture during the combining. The combining can comprise mixing during the combining to induce a shear on the solvent mixture. The stated mixing and thereby formation of phase inversion material results in higher production of the polymer-filler structures than continuous electro-spinning compositions and fibrillated polymer compositions. The application of a shear can facilitate the fibrillation of the polymer matrix. The combining the solvent mixture with the non-solvent can occur without actively mixing the solvent mixture with the non-solvent, for example, at least one of the solvent mixture or the non-solvent can be merely added (for example, poured or injected or otherwise) to the other of the solvent mixture or the non-solvent without an active mixing (for example, without stirring from a stir bar).

The solvent or the non-solvent can each independently have a $\delta_d$ Hansen solubility parameter of $15 \leq \delta_d \leq 20$ megapascal$^{1/2}$ (MPa)$^{1/2}$, or $16 \leq \delta_d \leq 18.5$ MPa$^{1/2}$. The solvent can have a $\delta_p$ Hansen solubility parameter of $5 \leq \delta_p \leq 18$ MPa$^{1/2}$, or $8.5 \leq \delta_p \leq 16.5$ MPa$^{1/2}$. The solvent or the non-solvent can have a $\delta_h$ Hansen solubility parameter of or $4 \leq \delta_h \leq 12$ MPa$^{1/2}$, or $5 \leq \delta_h \leq 11.5$ MPa$^{1/2}$. The solvent or the non-solvent can comprise at least one of acetone, cyclohexanone, dimethylacetamide (DMAc), methyl ethyl ketone, N,N-dimethylformamide (DMF), dimethyl sulfoxide (DMSO), N-methylpyrrolidone (NMP), tetrahydrofuran (THF), tetramethyl urea, or trimethyl phosphate.

As is noted above, the non-solvent can be any solvent where the polymer has a lesser dissolving ability than the solvent. The solvent or the non-solvent can have a $\delta_d$ Hansen solubility parameter of $12 \leq \delta_d \leq 14.9$ MPa$^{1/2}$. The solvent or the non-solvent can each independently have a $\delta_p$ Hansen solubility parameter of $0 \leq \delta_p \leq 8$ MPa$^{1/2}$, or $1 \leq \delta_p \leq 4.9$ MPa$^{1/2}$. The solvent or the non-solvent can have a & Hansen solubility parameter of or $13 \leq \delta_h \leq 50$ MPa$^{1/2}$, or $15 \leq \delta_h \leq 45$ MPa$^{1/2}$. The solvent or the non-solvent can comprise at least one of an acid solution, an alcohol (for example, a C1-C12 alkanol), an aliphatic hydrocarbon, an aromatic hydrocarbon, a basic solution, butyrolactone, N-butyl acetate, carbitol acetate, diisobutyl ketone, dimethyl phthalate, ethyl acetoacetate, a glycol ether, a glycol ether ester, glyceryl triacetate, a halogenated solvent, isophorone, methyl isobutyl ketone, propylene carbonate, triethyl phosphate, or water. The pH of the acid or basic solution are selected so as to not substantially degrade the polymer used in the composition. For example, the pH of the acid solution can be 1 to 6.5, and the pH of the basic solution can be 7.5 to 11.

The non-solvent can be present in excess of the solvent. For example, a volume ratio of the non-solvent to the solvent can be 2:1 to 1,000:1, or 10:1 to 500:1.

Without intending to be bound by theory, it is believed that when forming the composition, if the polymeric molecules can recoil or collapse back into a dense, coiled structure with little elongation, intertwining, or interpenetration with other adjacent polymer molecules, the polymer can be less effective in binding the various fillers, including active materials, and can have a less than sufficient structural integrity. It was found that the ideal situation is to create a composition or other film with a polymer that is more fully extended and intertwined with both the particulate materials (for example, inert fillers or active battery electrode materials) and with neighboring extended polymer chains. A single polymer chain, deployed essentially as a single "thread" extending and intertwining with neighboring polymer chains as well as throughout a mass of particulate materials (powders, fibers, flakes, agglomerates, etc.), without being bound by theory, it is believed to provide maximum capture (i.e., structural stability) for restraining particles and keeping them exposed and in close contact with one another (improved ionic and electronic rate capabilities, respectively).

The precipitate can then be isolated (separated) from the liquid phase (the solvent and the non-solvent). The separating can comprise at least one of draining, filtering (by gravity or under vacuum), or centrifuging the solvent and the non-solvent from the precipitate. In an aspect, the precipitate can be quickly separated from the liquid phase, for example at a rate of greater than or equal to 95 weight percent, or greater than or equal to 99 weight percent of removal of the solvent and the non-solvent from the precipitate, in less than or equal to 15 seconds, or less than or equal to 1 second. The process is therefore suitable for large-scale or economical manufacture.

The precipitate can be used as isolated from the liquid phase, for example, in a particulate form or the separated precipitate can then be formed into a layer. The layer can be formed by depositing the precipitate onto a substrate (for example, a flat substrate) and drying the precipitate to remove any remaining solvent and non-solvent. Forming the layer can comprise at least one of thermoforming, calendaring, laminating, roll coating, or other method. Multiple layers can be formed by sequentially depositing the precipitate and shaping the multiple layers at one time, or by shaping after each deposit.

The isolated precipitate can be used in the manufacture of other forms, for example fibers or other three-dimensional shapes. The forming can be by extruding, pasting, trawling, thermoforming, calendaring, laminating, roll coating, molding, or other method of forming a shape.

A benefit to the present composition can be derived from optimized structures including the molecular structure, the micro/nanostructure, and the macrostructure. Considering the molecular structure, the filler and the polymer can be selected based on the desired use. The filler can comprise at least one of a salt, a metal oxide, silica (for example, a hydrophobic fumed silica or a hydrophilic fumed silica), a glass, a silicon dioxide glass such as fiberglass or other type of glass, a carbonaceous material (for example, carbon black, carbon fibers, carbon nanofibers, graphite, or graphene), an organic material (for example, a polymer in powder form that does not dissolve in the solvent such as ethyl cellulose), a non-metal oxide, a clay, a quartz, a calcium carbonate, or other specific organic materials such as a particulate rubber (for example, a styrene-based copolymer such as acrylonitrile-butadiene-styrene), or wood pulp. The filler can comprise at least one of titanium dioxide, silicon dioxide, boron nitride, activated carbon, or carbon black. The filler can be in the form of at least one of particulates (for example, spherical or irregularly shaped), agglomerates, flakes, fibers, or whiskers. A least one of the non-solvent mixture or the solvent comprises a filler. For example, the non-solvent can comprise a first filler and the solvent can comprise a second filler. If the polymer comprises a fluoropolymer or an epoxy, then the filler can comprise at least one of clay, quartz, calcium carbonate, or wood pulp. The filler can comprise a dissolvable filler. The dissolvable filler can comprise a salt (for example, sodium chloride, ammonium chloride, sodium sulfate, or calcium chloride). If the filler comprises a dissolvable filler, then after the dissolvable filler is dissolved, the composition can comprise 0 to 15 wt %, or 0 to 1 wt %, or 0 wt % of the dissolvable filler based on the total weight of the composition minus any solvent.

The filler can have an average largest particle size of less than or equal to 50 micrometers, or less than or equal to 5 micrometers that can be determined by dynamic light scattering. The filler can comprise a multimodal particle distribution, for example, to increase the packing of the filler in the composition. For example, The polymer can comprise at least one of a fluoropolymer (for example, polyvinylidene fluoride (PVDF)), an acrylic polymer, a polyolefin, a polyacrylonitrile, a nylon, a polyester, a polyamide, a polyether, a rubber, poly(vinyl chloride), poly(vinyl acetate), poly(vinyl alcohol), poly(vinyl pyrrolidone), or a silane. If the polymer comprises a hydrophobic polymer (for example, a fluoropolymer), then the solvent can comprise a hydrophobic solvent such as acetone and the non-solvent can comprise a hydrophilic non-solvent such as water. If the polymer comprises a hydrophilic polymer (for example, a poly(vinyl alcohol), then the solvent can comprise a protic or polar solvent such as water and the non-solvent can comprise a nonpolar non-solvent such as acetone.

Table 1 shows a non-limiting overview of various materials that can be used in the present disclosure.

TABLE 1

| Polymer | Solvent Category | Solvent example | Non-solvent | Non-solvent example |
| --- | --- | --- | --- | --- |
| Poly(vinyl alcohol) 98% Hydrolyzed | ketone | acetone | aqueous | water |
| Polyethyleneoxide | aromatic | xylenes | aqueous | vinegar |
| Polyimide | hydrocarbon | hexanes | amine/amide | DMF |
| Methyl cellulose | aromatic | xylenes | alcohol | ethanol |
| Poly(vinylidene fluoride-hexafluoropropylene) | alcohol | isopropanol | ketone | acetone |
| polystyrene | aqueous | water | aromatic | xylenes |
| Poly(vinyl acetate) | ketone | acetone | hydrocarbon | hexanes |
| Poly(amide-imide) | alcohol | ethylene glycol | amine/amide | DMAC |
| Poly(vinylidene fluoride) | aromatic | xylenes | amine/amide, ketone | NMP |

The micro/nanostructure of the polymer can comprise elongated polymer chains or fibrils that can intertwine with neighboring elongated chains to form a tight matrix around the filler to hold the form of the composition, the resultant composition can therefore have improved properties. The net result of having high levels of elongation of the polymer molecules within the bulk polymer body can include the composition having improvements in at least one of strength, elongation to failure, modulus, or thermal response as compared to the composition comprising the same materials but formed by a different method.

Considering the macroscale structure of the composition, the composition can be in the form of at least one of particles, beads, filaments, fibers, or agglomerates, or the composition can be in the form of a layer.

The void content (porosity) of the composition can range from nearly solid to extremely porous. Depending on the medium in which the composition is placed, the composition can be or impervious to extremely porous and permeable. The composition can have a porosity equal to the tap density of the filler and upwards of to 90% volume percent based on a total volume of the composition. The composition can have a combination of macropores (having an average pore size of greater than 50 micrometers, mesopores (having an average pore size of 2 to 50 micrometers, and micropores (having an average pore size of less than 2 nanometers. The composition can be compressed, for example, by calendering to reduce the porosity. The reduced porosity can be 35 to 50 volume percent based on a total volume of the composition.

The ability to dictate the macroscale structure can be enabled by controlling the factors pertaining to the starting formulation or process variables before or during formation of the composition. For instance, an initial solution with a high solvent, high filler to low polymer ratio that produces a composition in the form of particles or filaments, can be post-processed, for example, casting to form a layer. Other factors include adjusting the ratio of the filler to the polymer and the mixing dynamics and the amount of shear imposed (for example, by controlling the mixing time, the mixing speed, or the ratio of the solvent to non-solvent). The control of such configurations of the composition can enable optimizing for various uses.

The ability to produce compositions with different macro-structures can allow it to be used in an abundance of different applications. For example, particles can function well in fluidized bed reactors or when deposited on or within a cloth, filter, or other fibrous article. Thin wall films, for example, can be used as a battery component such as a battery separator, or as a filtration membrane, when high porosity films are employed. When less porous or even solid films are arranged in a pleated structure within a chamber, the composition can function as a high surface area media for a bioreactor through which a solution can be passed. Thick bulk structures can have various uses such as absorbent materials or high through-put filters capable of trapping large volumes of particulates of interest.

The present disclosure is unique in that different macro-structures of the composition can be optimized accordingly for an article, merely by altering the formula or process controls. This ability to easily tune the final properties of the composition merely by modifying the process is in contrast to conventional methods. For instance, the use of solvent coating techniques are often used for thin film production, but sintering is often required to produce bulk structures such as blocks or rods. The present method can be considered as being based on the creation of a thick slurry or paste of particles suspended in the liquid phase (which includes the solvent and nonsolvent) with largely solidified polymers with intermixed, attached fillers that can be then coated, sprayed, pressed, molded, cast or otherwise formed into a final shape, which can vary across a wide range of dimensional parameters from thin or narrow to broad and massive with almost any aspect ratio of short and long dimensions, including convoluted and irregular shapes.

One particularly advantageous processing technique for the creation of sheets or films involves the use of the composition liquid dispersions/slurries, created by the phase inversion process, in a typical papermaking process. The use of FOURDRINIER or HATSCHEK machines or other wire screen dewatering system can allow the creation of papers or non-woven films that can then be further pressed, bonded together or otherwise manipulated just as with any typical fibrous mat making process.

The composition can comprise 0 to 99 wt %, or 85 to 99 wt %, or 90 to 98 wt %, or 90 to 96 wt % of the filler based on the total weight of the composition. The composition can comprise 1 to 100 wt %, 1 to 15 wt %, or 2 to 10 wt %, or 4 to 10 wt % of the polymer matrix based on the total weight of the composition. A weight ratio of the filler to the polymer can be greater than or equal to 8:1, or 9:1 to 50:1.

A layer can be formed from the composition. The layer can have a thickness of 0.01 to 100 millimeters, or 0.1 to 50 millimeters, or 1 to 10 millimeters, or 0.05 to 10 millimeters. The layer can have an increased thickness that can allow it to be free standing in that it does not need to be supported by a substrate layer in order to maintain their structural integrity. This feature can allow for easier handling and processing of the composition.

The composition can be in the form of a layer (which includes films, sheets, and the like), a plurality of fibers, a molding, or a membrane. The composition can be used in an electrode of a battery. The composition can be used in an electrode for an electrochemical cell. A typical electrochemical cell, whether aqueous or non-aqueous, primary or secondary or of other various cell types, will often have one or more particulate materials (called active materials) that react with various electrochemical species such as hydrogen protons or hydroxide species, anion or cation molecules, water or hydration products and so on. One of the purposes of using polymers to create these electrodes is to form a stable physical structure (the electrode) that can allow nearly full exposure of the active material to the ionic species via its electrolyte medium.

In specific examples, the composition can be used as a separator in battery, where the polymer can comprise poly(vinylidene fluoride), the filler can comprise at least one of a hydrophobic fumed silica, a hydrophilic fumed silica, fiberglass, a particulate thermoset, and the non-solvent can comprise at least one of poly(vinyl alcohol), ethyl cellulose, a hydrophobic fumed silica, or a hydrophilic fumed silica in at least one of water or alcohol. The composition can be used in a cathode in a battery, where the polymer comprises poly(vinylidene fluoride), the filler comprises lead dioxide, and the non-solvent comprises at least one of water or alcohol and an optional metal (for example, titanium or germanium). The composition can be used as a high power capacitor (for example, for wireless charging), where the polymer can comprise at least one of poly(vinylidene fluoride) or poly(amide imide) and the filler can comprise at least one of a salt or boron nitride.

In summary, the present method can result in a composition with improved properties by converting the polymer from dissolved species into a precipitated species while blocking the chains from recoiling or agglomerating into spherical molecules due to the presence of the filler. The composition can be used in an article, for example, in a filter, an adsorption membrane, a battery, an electrochemical cell, or a reactor (for example, a fluidized bed or a bioreactor).

The following examples are provided to illustrate the present disclosure. The examples are merely illustrative and are not intended to limit devices made in accordance with the disclosure to the materials, conditions, or process parameters set forth therein.

EXAMPLES

Example 1: Preparation of an Anode Using a Phase Inversion Technique

A porous carbon black-PVDF anode (C-PVDF) was prepared using a phase inversion technique using water as the non-solvent. 1 gram of PVDF was dissolved in 42.5 grams acetone. 19 grams of carbon black were added to the PVDF mixture and mixed via a SILVERSON mixer at 10 revolutions per minute to form the solvent mixture. Portions of the solvent mixture were injected into 25 milliliters of water by rapidly squirting the solvent mixture into the water via a pipette and filtering the precipitate until all of the solvent mixture was precipitated. The water was being actively mixed via a stir bar during the injecting. The PVDF fibrillated in the presence of the carbon black and formed the composition. The filtering was performed by pouring over a coffee filter. The precipitate was dried at 90 degrees Celsius (° C.) to remove acetone and water and the precipitate was compressed to form a free-standing mat having a thickness of 2 millimeters. The mat was then dried again at 130° C.

Figure 2:
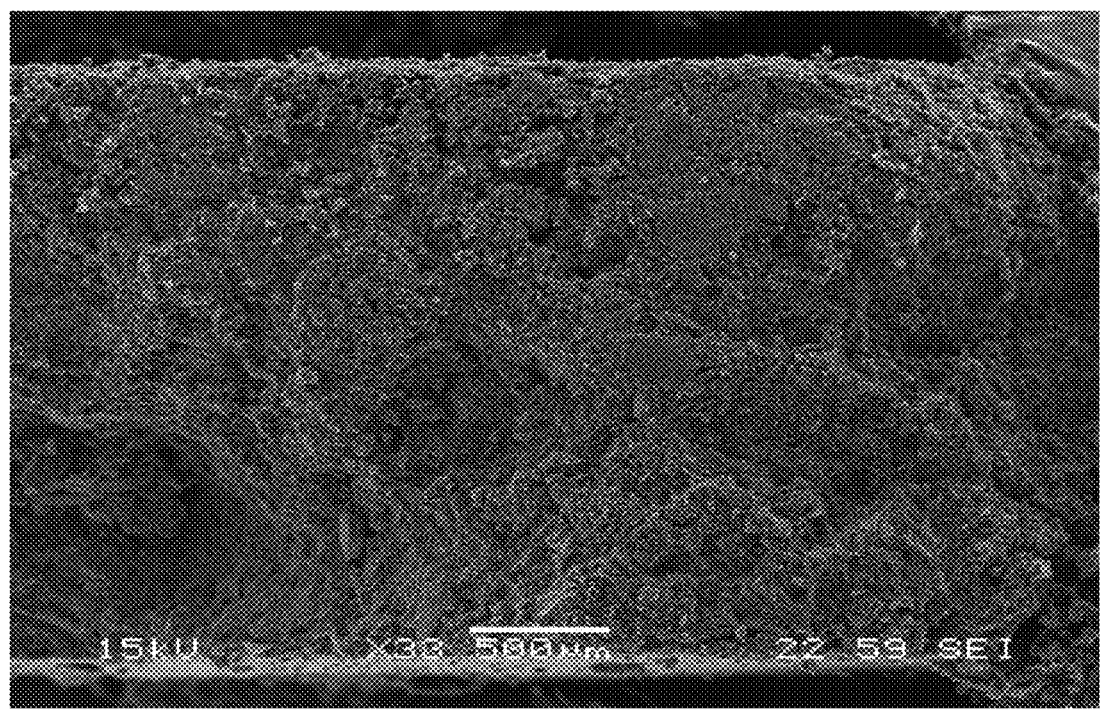
FIG. 2 is a scanning electron microscopy image of the carbon-PVDF layer of Example 1.
Figure 3A:
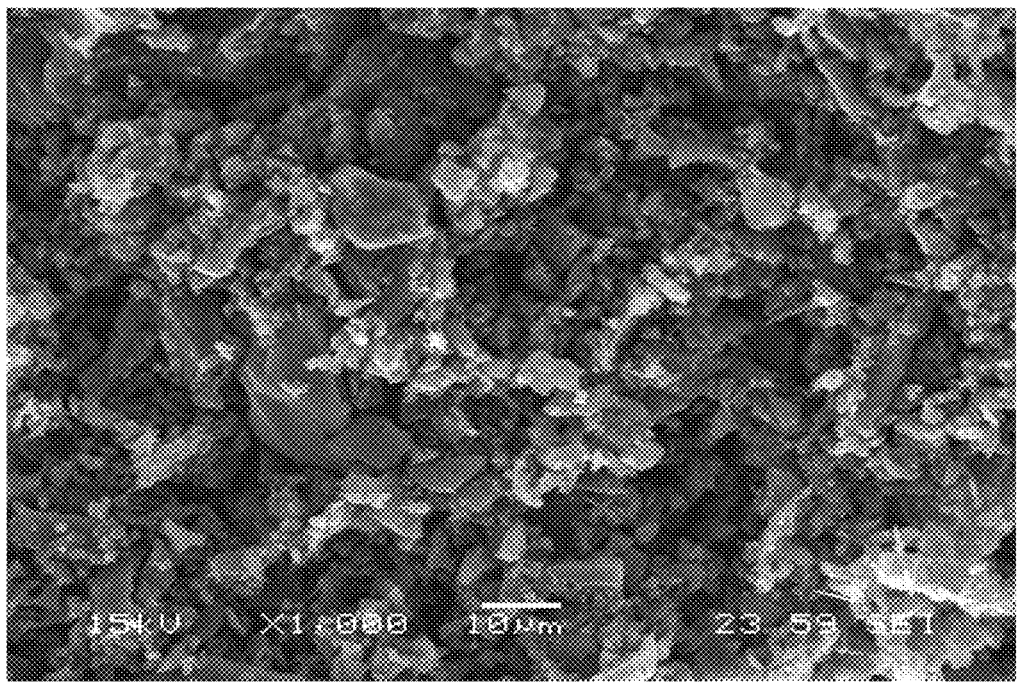
FIG. 3A is a is a scanning electron microscopy image of the carbon-PVDF layer (cross-sectional×1000 view) of Example 1.
Figure 3B:
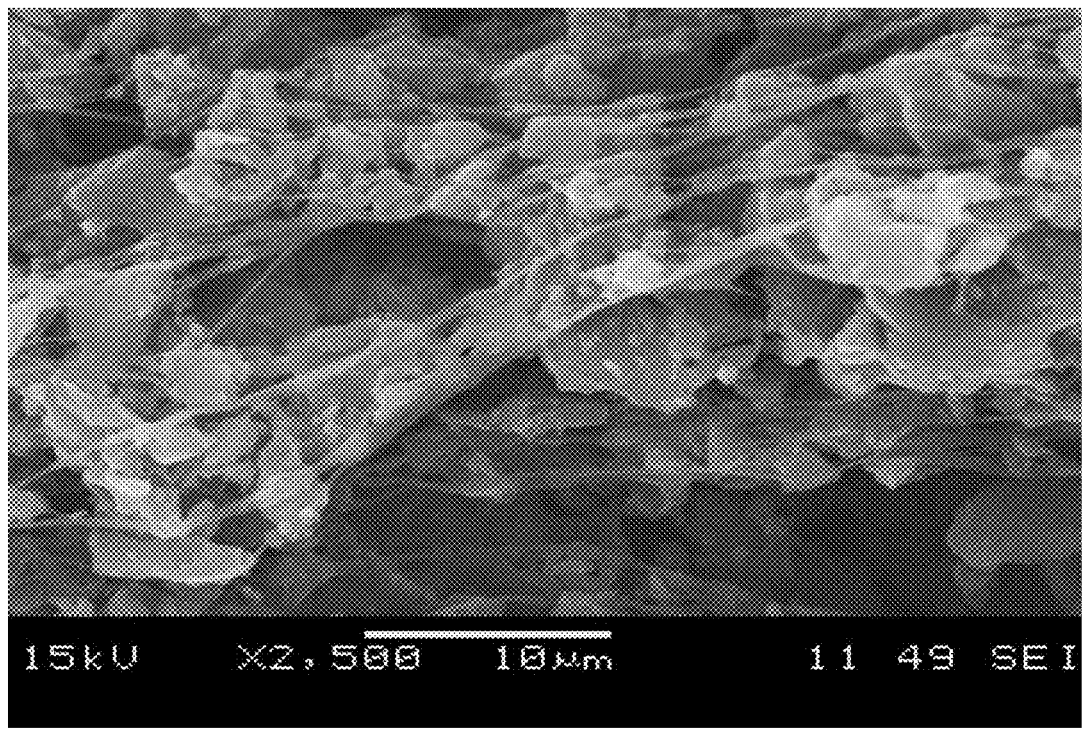
FIG. 3B is a scanning electron microscopy image of the carbon-PVDF layer (cross-sectional×2,500 view) of Example 1.

FIG. 1 is a photographic image of the carbon-PVDF layer having a thickness of 2 millimeters. FIG. 2, FIG. 3A, and FIG. 3B are scanning electron microscopy images of the carbon-PVDF layer at different magnifications. FIG. 3B clearly shows the presence of the fibrillated network with a high exposure of the filler surface area.

Example 2: Comparative Polymer Membrane

Figure 4:
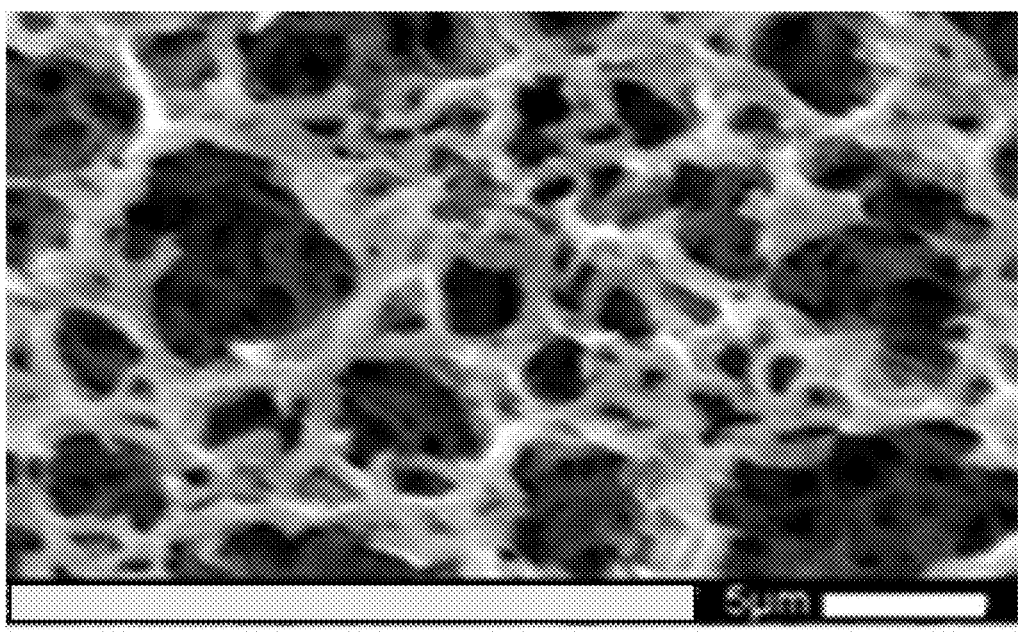
FIG. 4 is a scanning electron microscopy image a non-filled polymer membrane prepared in accordance with U.S. Pat. No. 8,147,732 of Example 2.
Figure 5:
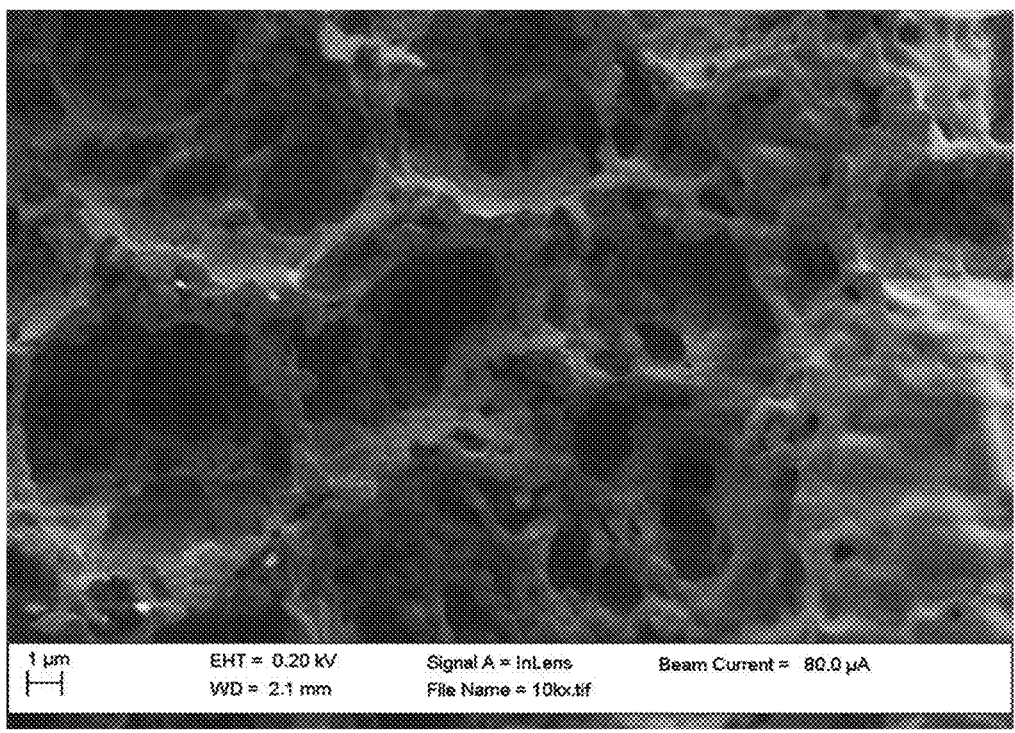
FIG. 5 is a scanning electron microscopy image of a non-filled polymer membrane prepared in accordance with U.S. Pat. No. 8,147,732 of Example 2.

A non-filled and a filled polymer membrane were prepared by a different phase inversion process in accordance with U.S. Pat. No. 8,147,732. Scanning electron microscopy images were taken and are shown in FIG. 4 and FIG. 5, respectively. FIG. 4 shows the formation of a porous material. FIG. 5 shows that the fillers are fully covered by the polymer, in other words, there is no exposed surface area of the filler.

Example 3: Comparison of the Phase Inversion Method of Example 1 to a Different Method Photographs of the composition after the phase inversion of Example 1 were taken with the precipitate present in the solvent and non-solvent, where the filler to PVDF weight ratio was 95:5 and the weight ratio of water to acetone was 90:10. A top view and a side view are shown in FIG. 6A1 and in FIG. 6A2, respectively. FIG. 6A1 shows that the absence of the filler located on the edges of the dish or on the surface of the solution. FIG. 6A2 shows that the filler is located in the precipitate as is indicated by the clear layer of solvent/non-solvent in the middle of the dish. These two figures suggest that that the carbon filler is actually bound to the PVDF polymer.

A phase inverted solution was formed using the same materials but with a different process. A top view and a side view are shown in FIG. 6B1 and in FIG. 6B2, respectively. FIG. 6B1 shows that the carbon filler IS located on the edges of the dish as well as on the surface of the solution. FIG. 6B2 shows that the filler is dispersed throughout the solution. These two figures suggest that that the carbon filler is not bound to the PVDF polymer.

Example 4: Formation of a PVDF Composition 1 gram of PVDF was dissolved in 42.5 grams of acetone and 19 g of sodium chloride was added to form a solvent mixture by mixing at ambient temperature (about 23° C.). Portions of the solvent mixture were injected into 25 milliliters of water by rapidly squirting the solvent mixture into the water via a pipette and filtering the precipitate until all of the solvent mixture was precipitated. The PVDF fibrillated in the presence of the salt crystals and formed the composition. The filtering was performed by pouring over a coffee filter. The salt was washed out to result in a fibrillated PVDF that was free of the salt. The fibrillated PVDF was dried at 90° C. to remove acetone and water and the fibrillated PDVF was compressed to form a free-standing mat. The mat was then dried again at 130° C. The same process was performed without the presence of the salt and the PVDF precipitated from solution without forming the fibrils.

FIG. 7A is a scanning electron microscopy image of the PVDF after removal of the salt. Elemental analysis of the PDVF after the salt removal was performed and the results are shown in FIG. 7B and in FIG. 7C.

Example 5: Formation of a Poly(Vinyl Alcohol) Composition

A poly(vinyl alcohol) composition was prepared in accordance with Example 1 except that 0.5 grams of poly(vinyl alcohol) were dissolved in 20 grams of water; 4.25 grams of titanium dioxide and 0.25 grams of silicon dioxide were added as the filler; and the solvent composition was added to 3 grams of acetone as the non-solvent. A phase inverted composition was formed.

Example 6: Formation of a PVDF-HFP Compositions

A PVDF-HPF composition was prepared in accordance with Example 1 except that 0.25 grams of poly(vinyl alcohol-hexafluoropropylene) were dissolved in 20 grams of acetone; 4.75 grams of carbon black were added as the filler; and the solvent composition was added to 3 grams of isopropanol as the non-solvent. The process was repeated varying the weight ratio of polymer:carbon black from 0.25:4.75 to 0.5:4.5 and 0.75:4.25 grams. Phase inverted compositions were formed.

Example 7: Formation of a Polystyrene Composition

A polystyrene composition was prepared in accordance with Example 1 except that 0.5 grams of polystyrene were dissolved in 20 grams of xylene; 5 grams of activated carbon were added as the filler; and the solvent composition was added to 3 grams of water as the non-solvent. A phase inverted composition was formed.

Example 8: Formation of a Poly(Amide-Imide) Composition

A poly(amide-imide)composition was prepared in accordance with Example 1 except that 0.75 grams of poly(amide-imide) were dissolved in 20 grams of DMAC; 5 grams of hexagonal boron nitride were added as the filler; and the solvent composition was added to 3 grams of ethylene glycol as the non-solvent. A phase inverted composition was formed.

Set forth below are non-limiting aspects of the present disclosure.

Aspect 1: A method of making a composition, the method comprising: forming a solvent mixture comprising a polymer and a solvent; precipitating the solvent mixture with a non-solvent to form the composition comprising the filler in a fibrillated polymer matrix, wherein the composition is in the form of a particulate and at least one of the solvent and the non-solvent comprises a filler; and separating the composition from the solvent and the non-solvent to isolate the composition.

Aspect 2: The method of Aspect 1, wherein the composition comprises greater than or equal to 75 weight percent of the filler; and 1 to 25 weight percent of the fibrillated polymer matrix; wherein the weights are based on the total weight of the composition minus any solvent; or wherein the solvent mixture comprises greater than or equal to 50 to 95 weight percent of the solvent based on the total weight of the solvent mixture.

Aspect 3: The method of any one or more of the preceding aspects, wherein at least one of the solvent and the non-solvent comprises at least one of acetone, cyclohexanone, dimethylacetamide, methyl ethyl ketone, N,N-dimethylformamide, dimethyl sulfoxide, N-methylpyrrolidone, tetrahydrofuran, tetramethyl urea, or trimethyl phosphate; and wherein the other of the solvent and the non-solvent comprises at least one of an acid solution, an alcohol, an aliphatic hydrocarbon, an aromatic hydrocarbon, a basic solution, butyrolactone, N-butyl acetate, carbitol acetate, diisobutyl ketone, dimethyl phthalate, ethyl acetoacetate, a glycol ether, a glycol ether ester, glyceryl triacetate, a halogenated solvent, isophorone, methyl isobutyl ketone, propylene carbonate, triethyl phosphate, or water.

Aspect 4: The method of any one or more of the preceding aspects, wherein the combining the solvent mixture with the non-solvent comprises pouring or injecting the solvent mixture into the non-solvent; and wherein the combining comprises actively mixing.

Aspect 5: The method of any one or more of the preceding aspects, wherein the separating the precipitate comprises at least one of draining, screening, or filtering the precipitate, preferably at a rate of greater than or equal to 95 weight percent, or greater than or equal to 99 weight percent of the solvent and the non-solvent from the precipitate, in less than or equal to 15 seconds, or less than or equal to 1 second; and drying the composition.

Aspect 6: The method of any one or more of the preceding aspects, further comprising forming a layer, optionally wherein multiple layers form the composition, wherein the forming the composition comprises extruding, pasting, molding, trawling, thermoforming, calendaring, laminating, roll coating, or other methods of forming a layer.

Aspect 7: The method of any one or more of the preceding aspects, wherein the filler comprises at least one of a salt, a metal oxide, silica, a glass, a silicon dioxide glass, a carbonaceous material, an organic material, a non-metal oxide, a clay, a quartz, calcium carbonate, a particulate rubber, fiberglass, or wood pulp.

Aspect 8: The method of any one or more of the preceding aspects, wherein the filler comprises a dissolvable filler and wherein the method further comprises dissolving the dissolvable filler from the composition; where in the composition comprises 0 to 15 wt %, or 0 to 1 wt % of the dissolvable filler based on the total weight of the composition minus any solvent.

Aspect 9: The method of any one or more of the preceding aspects, further comprising forming a layer from the composition, wherein the forming the layer comprises at least one of thermoforming, calendaring, laminating, or roll coating the composition.

Aspect 10: The method of any one or more of the preceding aspects, wherein the polymer comprises at least one of a fluoropolymer, an acrylic polymer, a polyolefin, a polyacrylonitrile, a nylon, a polyester, a polyamide, a polyether, a rubber, poly(vinyl chloride), poly(vinyl acetate), poly(vinyl alcohol), poly(vinyl pyrrolidone), a silane, or an epoxy.

Aspect 11: A composition formed by the method of any one or more of the preceding aspects.

Aspect 12: The composition of the preceding aspect, wherein the composition has at least one of a porosity equal to or above the tap density of the filler, the composition is in the form of layer having a thickness of 0.05 to 10 millimeters, or 2.5 to 5 millimeters, or wherein the composition is in a form that is free standing.

Aspect 13: An article comprising the composition of Aspect 11 or 12, wherein the article is a filter, an insulator, a capacitor, an electrode, a battery, or a separator.

Aspect 14: A porous material manufactured by the method of any one or more of Aspects 1 to 10, wherein after removal of the solvent and the non-solvent, the filler particles are mechanically bonded together by the polymer and wherein the polymer is present as filaments adhering to and connecting the filler particles across interstitial spaces between the filler particles; and wherein the respective filler particles have bonded filament connections to one or more other particles.

Aspect 15: The porous material of Aspect 14 wherein the filaments are disposed in interstitial space between the filler particles such that the packing density of the filler is unchanged from the filler particles without the polymer, and such that the void volume of the porous material is largely unchanged with respect to the particles without the filler except in proportion to the volume of voids displaced by the polymer.

Aspect 16: The porous material of Aspect 14 or 15 having a void content of 40 to 99 volume percent, or 50 to 95 volume percent; wherein the average filler particle diameter is micrometer or sub-micrometer and the polymer filaments have an average diameter of less than or equal to 0.5 micrometers and a length of less than or equal to 2 micrometers; or the average filler particle diameter is less than or equal to 100 micrometers or less than or equal to 10 micrometers and the polymer filaments have an average diameter of 5 to 50% of the filler diameter; and wherein a nominal filament length connecting adjacent particles is 1 to 500% of the average filler diameter.

Aspect 17: The porous material of any one or more of Aspects 14, 15, or 16, wherein both the filler and the polymer are disposed in a uniform distribution without agglomeration or clumping of filler or congealing or stratification of polymer, and wherein the filler surface area exposure to a pore is greater than or equal to 50 area percent, or greater than or equal to 95 area percent.

Aspect 18: The porous material of any one or more of Aspects 14, 15, 16, or 17, wherein the porous material has uniform porosity throughout the porous material and a pore symmetry where the bubble point is less than a factor of 10 of the smallest pore diameter and preferably less than a factor of 2.

Aspect 19: A porous material precipitated from a polymer solution produced by a phase inversion where the majority of the liquids, typically 90% or more, including solvents and non-solvents, are mechanically removed (for example, by at least one of filtration, settling, decanting, centrifugation, spray-up, or filter cake compression). The mechanical removal can be a more economical and expeditious manner than that achieved by typical phase inversion processes that depend on drying, evaporation, liquid bath quenching, liquid extraction or similar methods to remove liquids from said porous material.

Aspect 20: The porous material of Aspect 19, wherein the porous material produced after the initial liquid removal and having a polymer-filler structure that is stabilized so as to maintain a porous structure of interspersed polymer and filler with liquid filling all or some of the pores, serves as a precursor for producing articles by conventional slurry processing equipment (for example, a paper making machine, a filter press, or the like), wherein liquid content is further reduced by at least one of drying, evaporation, compression, or the like to yield a bonded mass of a liquid-free porous material.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an aspect", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.).

The term "combinations comprising at least one of the foregoing" or "at least one of" means that the list is inclusive of each element individually, as well as combinations of two or more elements of the list, and combinations of at least one element of the list with like elements not named. Also, the term "combination" is inclusive of blends, mixtures, alloys, reaction products, and the like.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of making a composition, the method comprising:
    forming a solvent mixture comprising a polymer and a solvent;
    combining the solvent mixture with a non-solvent to precipitate a composition comprising a plurality of filler particles in a fibrillated polymer matrix, wherein the composition is in a form of a particulate, wherein the filler particles are mechanically bonded by one or more polymer fibers to at least one or more filler particles across an interstitial spaces within the formed particulates, and where the polymer fibers are caused to deposit in an elongated form within the interstitial space among the filler particles having bonded filament connections to at least one other particle, wherein at least one of the solvent and the non-solvent comprises the filler particles prior to the precipitating;
    removing greater than or equal to 95 percent of the solvent and the non-solvent from the composition after precipitating the composition in less than or equal to 15 seconds; and
    reducing a volume of the interstitial spaces between the dispersed filler particles, resulting in a decreasing of the interstitial spaces existing within the plurality of the dispersed filler particles;
    wherein the produced composition is porous and has a void content of 40 to 99 volume percent and comprises a filler content of greater than or equal to 90 volume percent based on the total volume of the composition, where the filler particles are attached to the polymer or are embedded within the composition and wherein the filler surface area exposure to a pore is greater than or equal 50 area percent;
    wherein the composition comprises greater than or equal to 90 weight percent of the filler particles and 1 to 10 weight percent of the fibrillated polymer matrix based on the total weight of the composition minus any solvent; and
    wherein the average filler particle diameter is less than or equal to 100 micrometers and the polymer filaments have an average diameter of 5 to 50% of the filler particle diameter.

2. The method of claim 1, wherein the solvent mixture comprises greater than or equal to 50 to 95 weight percent of the solvent based on the total weight of the solvent mixture.

3. The method of claim 1, wherein at least one of the solvent and the non-solvent is selected from the group consisting of: acetone, cyclohexanone, dimethylacetamide, methyl ethyl ketone, N,N-dimethylformamide, dimethyl sulfoxide, N-methylpyrrolidone, tetrahydrofuran, tetramethyl urea and trimethyl phosphate; and
    wherein the other of the solvent and the non-solvent is selected from the group consisting of: an acid solution, an alcohol, an aliphatic hydrocarbon, an aromatic hydrocarbon, a basic solution, butyrolactone, N-butyl acetate, carbitol acetate, diisobutyl ketone, dimethyl phthalate, ethyl acetoacetate, a glycol ether, a glycol ether ester, glyceryl triacetate, a halogenated solvent, isophorone, methyl isobutyl ketone, propylene carbonate, triethyl phosphate and water.

4. The method of claim 1, wherein the adding the solvent mixture to the non-solvent comprises pouring or injecting the solvent mixture into the non-solvent; and wherein the combining comprises actively mixing.

5. The method of claim 1, further comprising the step of: forming a layer comprising the composition, wherein the step of forming the layer comprises: extruding, pasting, molding, troweling, thermoforming, calendaring, laminating, or roll coating the composition.

6. The method of claim 1, wherein the filler is selected from the group consisting of: a salt, a metal oxide, silica, a glass, a silicon dioxide glass, a carbonaceous material, an organic material, a non-metal oxide, a clay, a quartz, calcium carbonate, a particulate rubber, fiberglass and wood pulp.

7. The method of claim 1, wherein the filler added to at least one of the solvent and the non-solvent prior to precipitating further comprises a dissolvable filler and wherein the method further comprises dissolving the dissolvable filler out of the composition; wherein the composition comprises 0 to 15 wt % of the dissolvable filler after the dissolving based on the total weight of the composition minus any solvent.

8. The method of claim 1, wherein the polymer is selected from the group consisting of: a fluoropolymer, an acrylic polymer, a polyolefin, a polyacrylonitrile, a nylon, a polyester, a polyamide, a polyether, a rubber, poly(vinyl chloride), poly(vinyl acetate), poly(vinyl alcohol), poly(vinyl pyrrolidone), a silane and an epoxy.

9. A composition formed by the method of claim 1.

10. An article comprising the composition of claim 9, wherein the article is a filter, an insulator, a capacitor, an electrode, a battery, or a separator.

* * * * *